United States Patent
Kamiya

(10) Patent No.: US 6,304,818 B1
(45) Date of Patent: Oct. 16, 2001

(54) VEHICULAR NAVIGATION SYSTEM WITH ROAD CURVE INFORMING FUNCTION

(75) Inventor: Takayuki Kamiya, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/550,020

(22) Filed: Apr. 14, 2000

(30) Foreign Application Priority Data

May 13, 1999 (JP) ............................................. 11-132867

(51) Int. Cl.[7] ............................................. G01L 21/30
(52) U.S. Cl. ..................................... 701/200; 701/208
(58) Field of Search .................................. 701/200, 205, 701/208, 210, 211; 340/990, 995

(56) References Cited

U.S. PATENT DOCUMENTS

| | | | |
|---|---|---|---|
| 5,661,650 | * | 8/1997 | Sekine et al. ........................... 701/23 |
| 5,978,731 | * | 1/1999 | Matsuda ................................ 701/208 |
| 6,058,350 | * | 5/2000 | Ihara ..................................... 701/208 |
| 6,067,497 | * | 5/2000 | Sekine et al. .......................... 701/93 |
| 6,138,084 | * | 10/2000 | Mine ..................................... 702/157 |
| 6,141,619 | * | 10/2000 | Sekine ................................... 701/93 |

FOREIGN PATENT DOCUMENTS 9-189565    7/1997   (JP) .

* cited by examiner

*Primary Examiner*—Tan Nguyen
(74) *Attorney, Agent, or Firm*—Law Office of David G. Posz

(57) ABSTRACT

In a vehicular navigation system, a computer retrieves from a memory four successive road coordinate points representing a road configuration. It calculates interpolated coordinate points by using a B-spline function based on the retrieved coordination points, and calculates radii r of curvature at the interpolated coordinates points. It then detects road curves and directions thereof based on the calculated radii of curvature. The detected curves are informed on a road map displayed on a display device from a speaker.

19 Claims, 10 Drawing Sheets

| t | X0(t) | X1(t) | X2(t) | X3(t) |
|---|---|---|---|---|
| 0 | 0.17 | 0.67 | 0.17 | 0 |
| 0.1 | 0.12 | 0.66 | 0.23 | 0 |
| 0.2 | 0.09 | 0.63 | 0.28 | 0 |
| 0.3 | 0.06 | 0.59 | 0.35 | 0 |
| 0.4 | 0.04 | 0.54 | 0.41 | 0.01 |
| 0.5 | 0.02 | 0.48 | 0.48 | 0.02 |
| 0.6 | 0.01 | 0.41 | 0.54 | 0.04 |
| 0.7 | 0 | 0.35 | 0.59 | 0.06 |
| 0.8 | 0 | 0.28 | 0.63 | 0.09 |
| 0.9 | 0 | 0.22 | 0.66 | 0.12 |
| 1 | 0 | 0.17 | 0.67 | 0.17 |

TRAVEL

VEHICULAR NAVIGATION SYSTEM WITH ROAD CURVE INFORMING FUNCTION

CROSS REFERENCE TO RELATED APPLICATION

This application relates to and incorporates herein by reference Japanese Patent Application No. 11-132867 filed on May 13, 1999.

BACKGROUND OF THE INVENTION

The present invention relates to a vehicular navigation system which retrieves coordinate points of road configurations included in road map data stored in a memory device, determines road curves and informs the determined road curves.

JP-A-9-189565 discloses a conventional vehicular navigation system. This system uses three successive coordinate points indicating a road configuration or shape to calculate a radius of a circle which passes through these coordinate points and a radius of curvature of a subject road curve. The presence and absence of the curve is determined based on the calculated radius of curvature. The system informs a vehicle driver by a visual display or vocal announcement of the position (point) of the curve together with its radius of curvature or length of the curve as well as an angle of curving.

A memory device such as CD-ROMs or the like which store the road map data and the like has a limited memory or storage capacity. Therefore, the memory device is incapable of storing a plenty of data of coordinate points indicative of road configuration to the extent sufficient to determine curves accurately. Thus, it is likely that the curve is determined only roughly or erroneously.

SUMMARY OF THE INVENTION

The present invention therefore has an object of providing a vehicular navigation system capable of determining road curves with high accuracy.

According to the present invention, four or more successive road coordinate points representing a road configuration are retrieved from a road map data. The road coordinate points are interpolated to have more coordinate points by using a B-spline function based on the retrieved road coordinate points. A radius of curvature is calculated with respect to each of the interpolated coordinate point. A road curve and direction thereof are detected based on the calculated radii of curvature.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
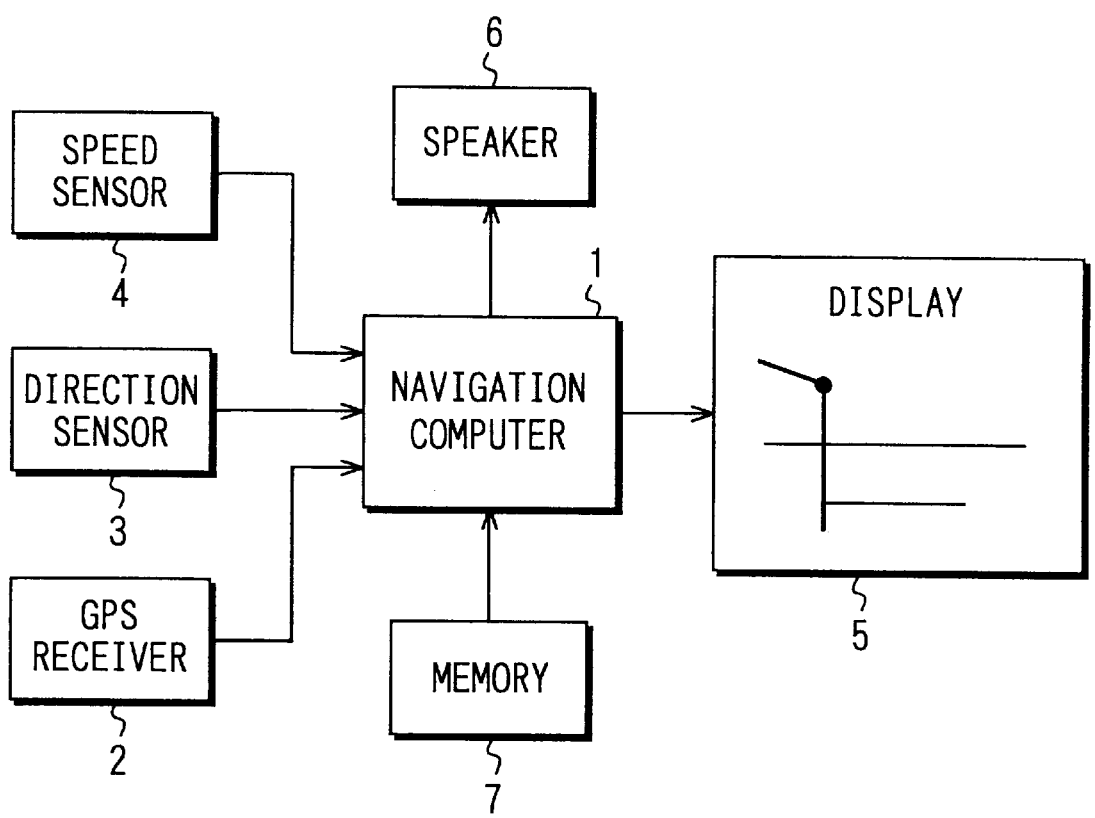
FIG. 1 is a block diagram showing a vehicular navigation system according to a first embodiment of the present invention.

Referring first to FIG. 1, a vehicular navigation system is mounted, for instance, on an automotive vehicle and has a navigation computer 1. The computer 1 is connected to a GPS receiver 2, a direction sensor 3, a vehicle speed sensor 4, a display device 5, a speaker 6 and a memory device 7. The GPS receiver 2 receives GPS signals transmitted from GPS satellites (not shown) to calculate a present position of a vehicle. The memory device 7 may be a CD-ROM which stores therein data of map (map data), data of road coordinate points (road coordinate data) indicating configuration or shape of roads on the map, data of audio sound (audio sound data). The computer 1 is programmed to execute various processing to calculate required information from the position data received from the GPS receiver 2, direction sensor 3, vehicle speed sensor 4 and memory device 7, and to drive the display device 5 and the speaker 6 based on the calculated data.

Figure 2:
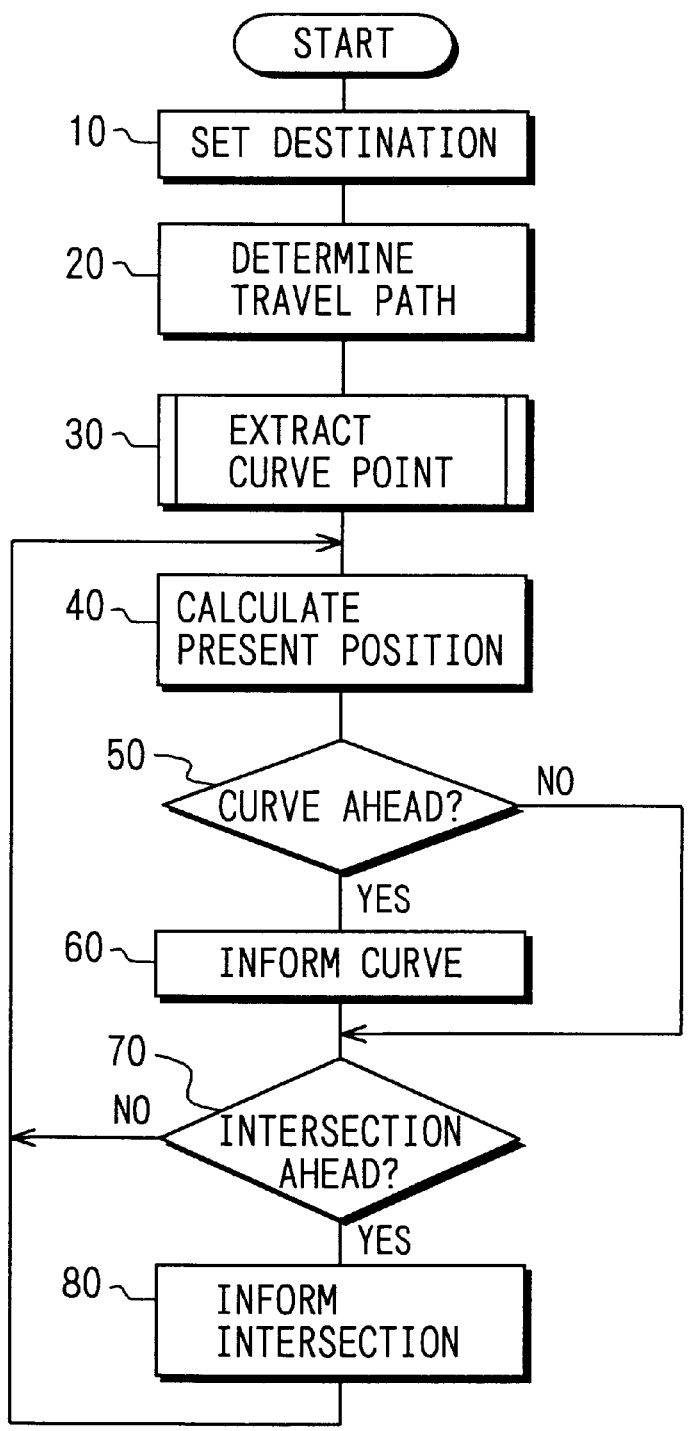
FIG. 2 is a flow diagram showing a main routine executed in the first embodiment.

Specifically, as shown in FIG. 2, the computer 1 first sets a travel destination at step 10 in response to a vehicle driver's manual command operation on a keyboard (not shown). It then retrieves at step 20 various data of roads from the memory device 7 and determines a vehicle travel path to the set destination. The data includes road coordinate points which exist between the present position to the travel destination.

The computer 1 extracts or detects at step 30 curve points which exist along the determined travel path. It then calculates at step 40 its present position based on the data received from the GPS receiver 2, and drives the display device 5 to display the map data around the calculated present position.

The computer 1 checks at step 50 whether there exist any road curves ahead of the vehicle in the travel path. If the check result is YES, the computer 1 informs the driver of existence of road curves at step 60. Each curve point on the travel path may be provided visually with an arrow marker, for instance, on the displayed map and audibly from the speaker 6.

The computer 1 further checks at step 70 whether there exist any intersections ahead of the vehicle on the travel path. If the check result is YES, the computer 1 informs the driver of intersections at step 80. Each intersection may be provided visually and audibly in the similar manner as the curve point. The computer 40 repeats the above processing starting from step 40, after the computer 1 determined NO at step 70 or completed step 80.

Figure 3:
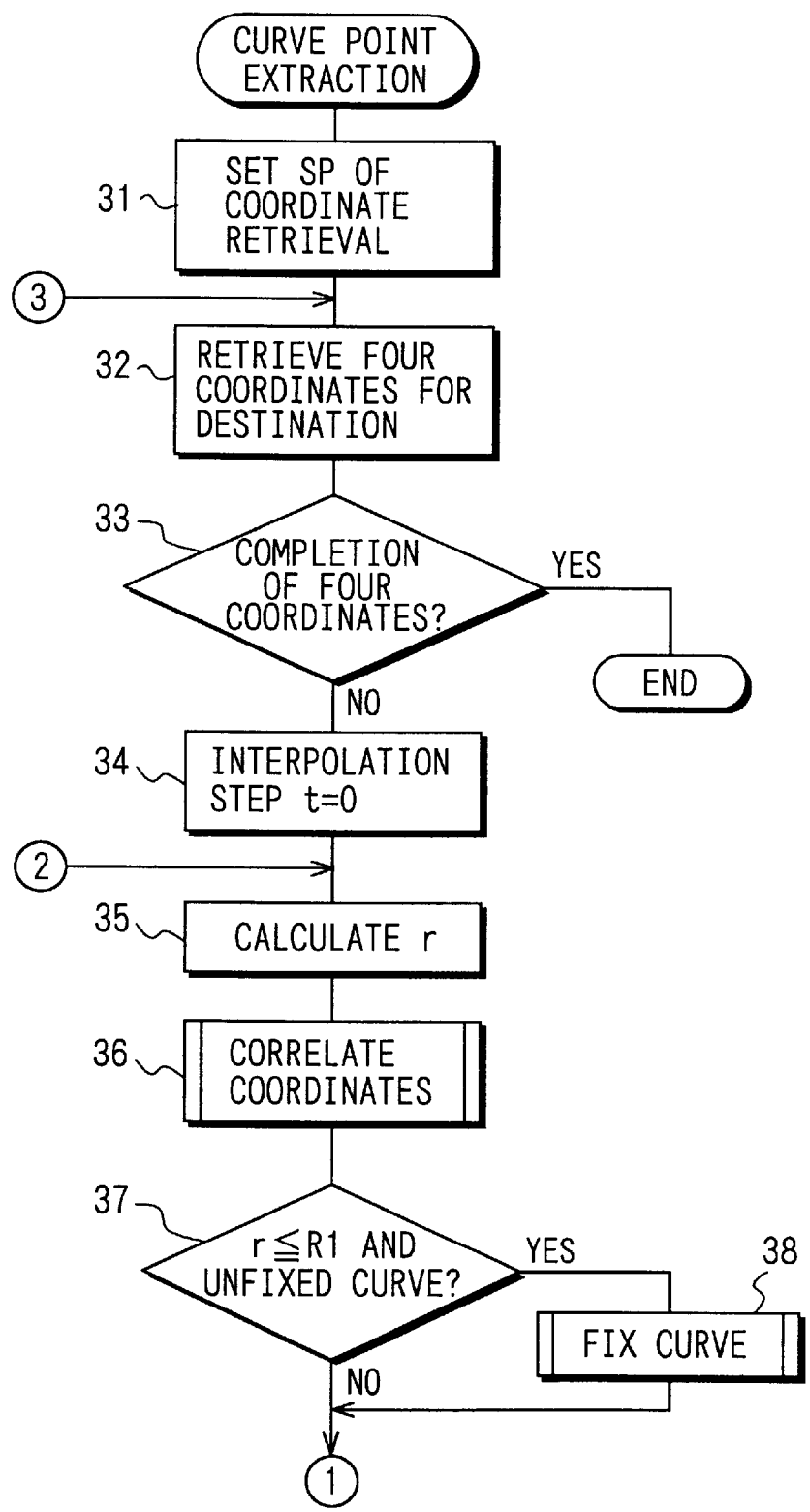
FIG. 3 is a flow diagram showing a part of curve point extraction processing shown in FIG. 2.
Figure 4:
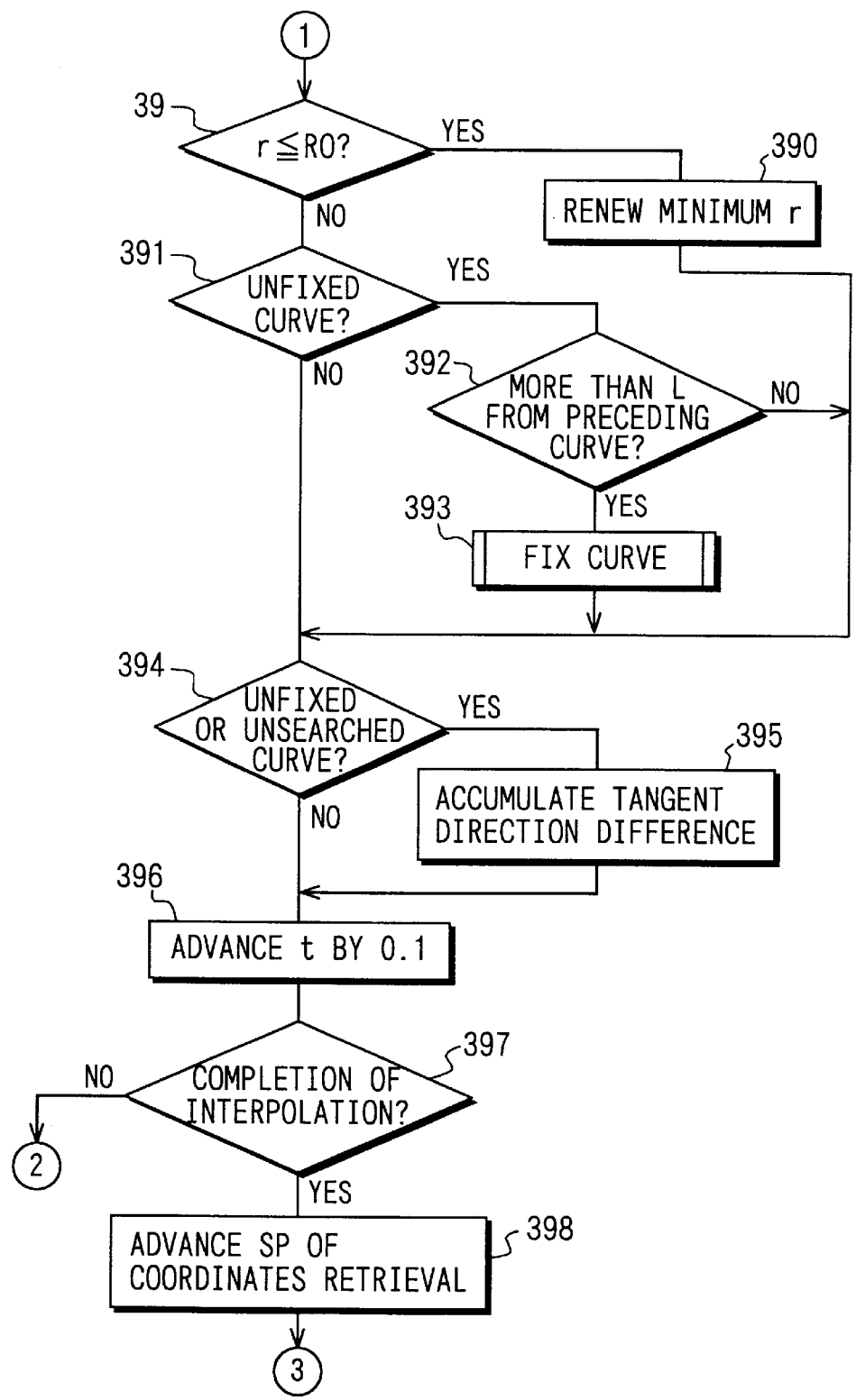
FIG. 4 is a flow diagram showing the other part of curve point extraction processing shown in FIG. 2.

The curve point extraction or detection processing of step 30 is executed as shown in FIGS. 3 and 4. The computer 1 first sets at step 31 a start point SP of retrieving road coordinate points from the memory device 7 to a nearby coordinate points of the present position. It then retrieves at step 32 four successive road coordinate points existing from the start point SP in a direction of vehicle travel toward the set travel destination.

The computer 1 further checks at step 33 whether all four successive road coordinate points are retrieved. If the check result is YES, it ends the processing. If the check result is NO, it sets interpolation step t=0 at step 34.

Figure 5:
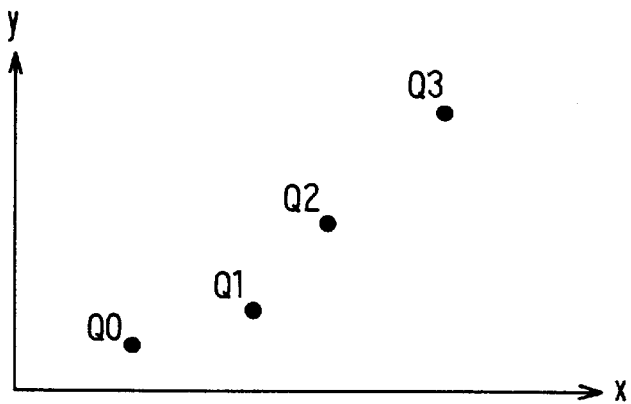
FIG. 5 is a graph showing a calculation of interpolation using a B-spline function.

The computer 1 calculates at step 35 the radius of curvature of interpolated coordinate points on a curve based on the four road coordinate points retrieved at step 32. Specifically, the interpolation calculation of coordinate points is executed as shown in FIG. 5, assuming that the four coordinate points Q0–Q3 are defined as follows (expression 1).

$$Q0=(x0, y0), Q1=(x1, y1), Q2=(x2, y2), Q3=(x3, y3)$$

The interpolation calculation of the curve is executed by using the B-spline function. The coordinate points P(t) interpolated by the B-spline function are expressed as follows (expression 2) with ($0 \leq t \leq 1$) being defined as the interpolation step.

$$P(t) = (x(t), y(t))$$
$$= X0(t) \times Q0 + X1(t) \times Q1 + X2(t) \times Q2 + X3(t) \times Q3$$

$$X0(t)=(1-t)^3/6$$

$$X1(t)=t^3/2-t^2+2/3$$

$$X2(t)=-1/2+t^2/2+t/2+1/6$$

$$X3(t)=t^3/6$$

Here, the interpolation step t is incremented by 0.1 each time.

Figure 6:
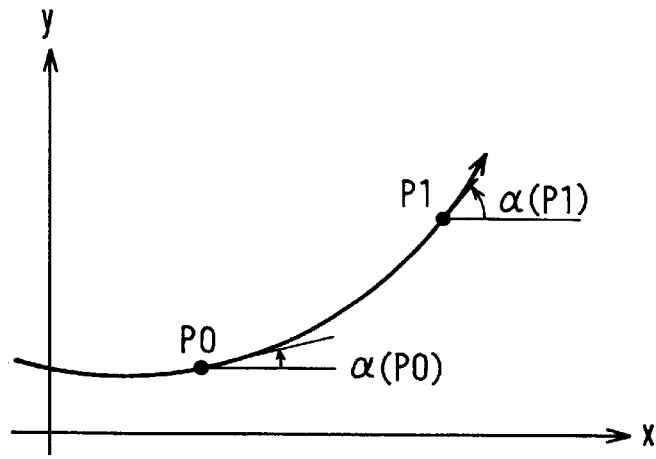
FIG. 6 is a graph showing a principle of calculating a radius of curvature.

The computer 1 further calculates at step 35 the radius of curvature r and the direction of tangent with respect to each interpolated coordinate points P(t). The radius of curvature r is an inverse of a curvature K. For instance, as shown in FIG. 6, the curvature K of a curve which passes through two interpolated points P0 and P1 is expressed as follows (expression 3).

$$K = \lim_{P1 \to P0} [\alpha(P1) - \alpha(P0)]/S$$

In this expression, $\alpha$ (P0) and $\alpha$ (P1) indicate angles of the tangents at the points P0 and P1, respectively, and S indicates a distance between the points P0 and P1.

Further, as described above, the interpolated coordinate points P(t) are expressed as a function of interpolation step t, that is, P(t)=(x(t), y(t)). The curvature K is expressed as follows (expression 4), assuming that the curve passing through the two points P0 and P1 to be y=f(x).

$$K=f(x)/[1+f(x)'^2]^{3/2}$$

The radius of curvature r is expressed as follows (expression 5), assuming that y=f(t) and x=g(t).

$$r = 1/K$$
$$= [x(t)'^2 + y(t)'^2]^{3/2} / [x(t)' \times y(t)'' - x(t)'' \times y(t)']$$

In this expression, "'" and "''" indicate the first order differentiation and the second order differentiation, respectively. In addition, the polarity "+" and "−" of the curvature K indicate a leftward curve and a rightward curve, respectively, assuming that the x-axis and the y-axis are on the right side and the left side in the direction of vehicle travel, respectively.

The inclination d of the tangent is calculated as follows (expression 6).

$$d=y(t)'/x(t)'$$

After calculating the radius of curvature r0 and the inclination of the tangent d0 with respect to the interpolated coordinate point P (t=0), the computer 1 then correlates at step 36 these calculation results r0 and d0 to the road coordinate point. The interpolated coordinate points from P(0) to P(1) are calculated as above in sequence.

If the curve is relatively sharp the maximum curve point (point of minimum radius of curvature r) deviates excessively from the road coordinate point Q1. The visual mark, which is superimposed to indicate the curve point on the displayed map of the display device 5, deviates from a road on the displayed map. That is, if the road coordinate points calculated as the interpolated coordinate points P(0)–P(1) are used, the position of the curve existing ahead cannot be displayed on the road on the displayed map or the audible announcement of the same cannot be issued.

Figures 8, 9:
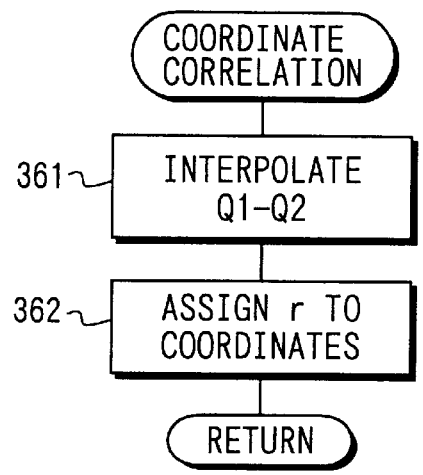
FIG. 8 is a flow diagram showing a coordinate correlating processing shown in FIG. 3.
FIG. 9 is a table showing changes in weight of the B-spline function against interpolation steps.

For this reason, the computer 1 executes the coordinate correlation step 36 which is shown in detail in FIG. 8. Specifically, the computer 1 interpolates the coordinate points between Q1 and Q2 by dividing the same by ten (n=10) at step 361. That is, the interpolated coordinate points P'(0) and P'(1) are correlated to the coordinate points Q1 and Q2, respectively. Although P'(0) is calculated, it is substantially equal to the coordinate points Q1, that is, P'(0)=Q1. The computer 1 then assigns at step 362 the radius of curvature r0 calculated at step 35 (FIG. 3) to the interpolated coordinate point P'(0).

Here, the coefficients or weights, X0(t) to X3(t) of the B-spline function are shown in FIG. 9 in the case that the interpolation step is changed by 0.1 each time. As understood from this table, the coefficients X1(t) and X2(t) for the coordinate points Q1 and Q2 have larger values than X0(t) and x3(t). As a result, the coordinate points P(0)–P(1) interpolated between the coordinate points Q0 and Q3 are positioned near the coordinate points Q1 and Q2.

For this reason, the above deviation can be minimized by executing the coordinate correlation processing each time the interpolation step t is incremented by 0.1 and assigning the radii of curvature r0–r1 calculated with respect to the interpolated coordinate points P(0)–P(1) to the coordinate points P'(0)–P'(1) which are interpolated by dividing the line connecting the coordinate points Q1 and Q2. Thus, it is enabled to superimpose the curve-indicating mark along the displayed road connecting the original road coordinate points Q1 and Q2.

Referring back to FIG. 3, the computer 1 checks at step 37 whether the radius of curvature r calculated with respect to the interpolated coordinate point P(t) is within a direction fixing range R1 and there remains unfixed curve in the opposite direction, after completing the coordinate correlation processing at step 36.

Figure 10:
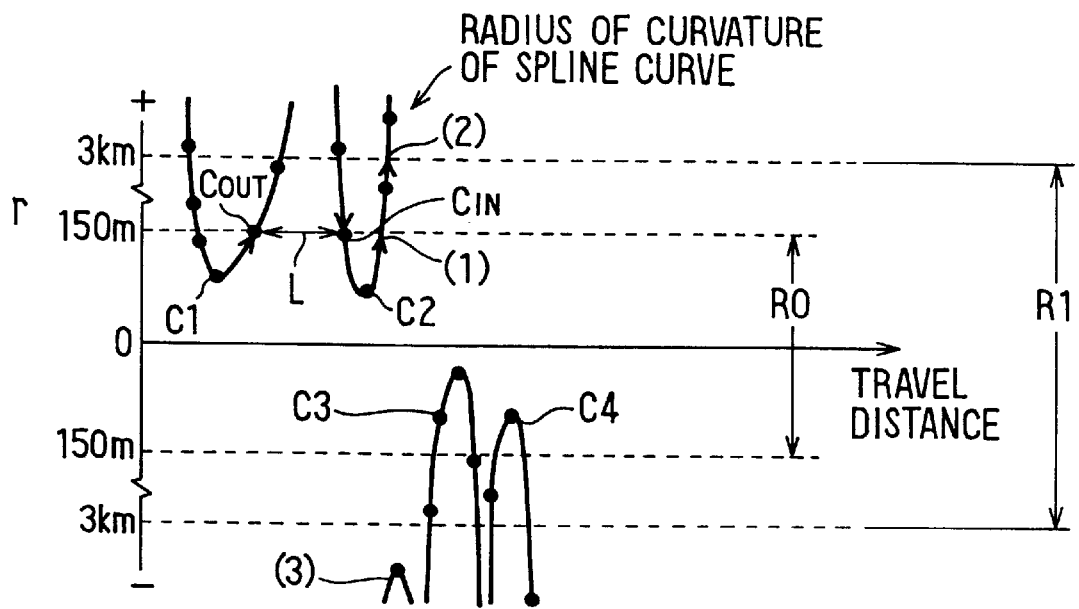
FIG. 10 is a timing diagram showing variations in the radius of curvature calculated based on a travel distance.

Here, as shown in FIG. 10, the direction fixing range Rl is defined as an area which is within a predetermined radius of curvature r, for instance, R1=±3 km. For instance, when the vehicle completes passing through the leftward curve, the radius of curvature r exceeds a curve fixing range R0, as shown by (1). Then, the radius of curvature r exceeds the direction fixing range R1, that is, r>+3 km, as shown by (2). When the radius of curvature r with respect to the next interpolated coordinate point P(t) exceeds the direction fixing range R1, that is, r<−3 km, as shown by (3), the road is considered to be generally straight.

Further, the unfixed curve in the opposite direction means an unfixed curve turning in a direction opposite to that of the preceding detected curve. For instance, in FIG. 10, a curve C3 is an unfixed curve in the opposite direction relative to the preceding curve C2. The unfixed curve is not yet checked as to whether the distance between the preceding fixed curve interval and the next curve interval is less than a predetermined curve fixing distance L. That is, the unfixed curve is a curve which has not yet been fixed as an independent curve as described later. Therefore, when the unfixed curve which exists within the direction fixing range R1 in the opposite direction appears, it is determined that the preceding curve has a curve interval extending up to this point.

Thus, if the check result at step 37 is YES, the computer 1 thus executes a curve fixing processing at step 38 to determine this curve point. If the check result at step 37 is NO, the computer 1 further checks at step 39 whether the radius of curvature r is within the curve fixing range R0. As shown in FIG. 10, the curve fixing range R0 is defined to ±150 m, for instance.

If the check result at step 39 is YES, the computer 1 renews the minimum radius of curvature at step 390. In this step, the radii of curvature existing within the fixing range R0 are compared one by one and finally stores the coordinate points which have the minimum radius of curvature. The computer 1 advances its processing to step 394 after step 390.

If the check result at step 39 is NO, on the other hand, the computer 1 further checks at step 391 whether there remain any unfixed curves. It is to be understood that if there remains an unfixed curve (YES at step 391), the preceding curve is considered to extend to this point. If the check result is YES, the computer 1 checks at step 392 whether the distance of the unfixed curve is more than a curve fixing distance L, for instance, 15 m. Here, as shown in FIG. 10, the curve distance is defined as an accumulated or integrated distance of road which starts from an end point COUT of the preceding curve interval, that is, from the point where the radius of curvature exceeds the range R0.

Figure 11:
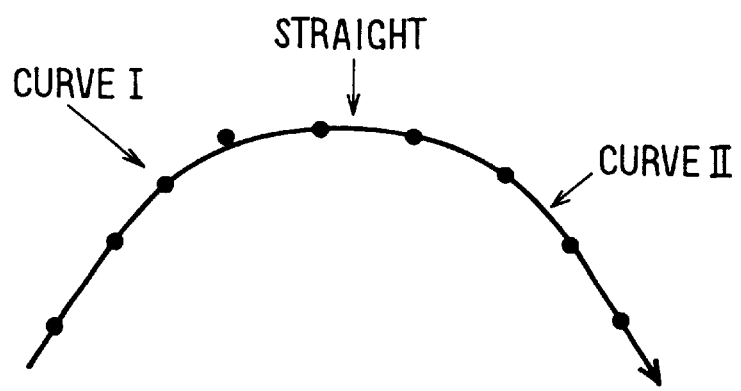
FIG. 11 is a schematic diagram showing an example of a road configuration having a straight road between two curves.

If there exists a straight road between two curves I and II due to insufficient data of road coordinate points as shown in FIG. 11, this series of the curve I, straight road and curve II are considered as one curve. If the check result at step 392 is NO indicating a short straight part between the curves I and II, the computer 1 advances its processing to step 394. If the check result is YES indicating a long straight part between the curves I and II, the computer 1 executes a curve fixing processing to fix the curve at step 393 in the same manner as at step 38.

After step 390, 391 (NO) or 393, the computer 1 checks at step 394 whether there exists an unfixed curve or a curve still being detected (YES at step 392). If the check result is YES, the computer 1 accumulates or integrates at step 395 a difference in direction of tangent relative to the preceding interpolated coordinate point P(t). This accumulation of tangent direction difference is for using it in determining the curve interval, as will be described later.

After step 394 (NO) or 395, the computer 1 increments the interpolation step by 0.1 at step 396, and checks at step 397 whether all the interpolation have been completed. If the check result is NO, the computer 1 repeats the above processing from step 35 (FIG. 3) to calculate the next interpolated coordinate point P(0.1). Thereafter, the radii of curvature are calculated by incrementing the interpolation step by 0.1 each time.

If the check result at step 397 is YES, the computer 1 advances to step 398, which is the start point of retrieving the road coordinate point toward the travel destination, repeats the above processing from step 32 (FIG. 3) to retrieve the next road coordinate point Q4 and executes the above processing with respect to the road coordinate points Q1, Q2, Q3, and Q4. The above processing is repeated until the road coordinate points reach the travel destination.

Figure 12:
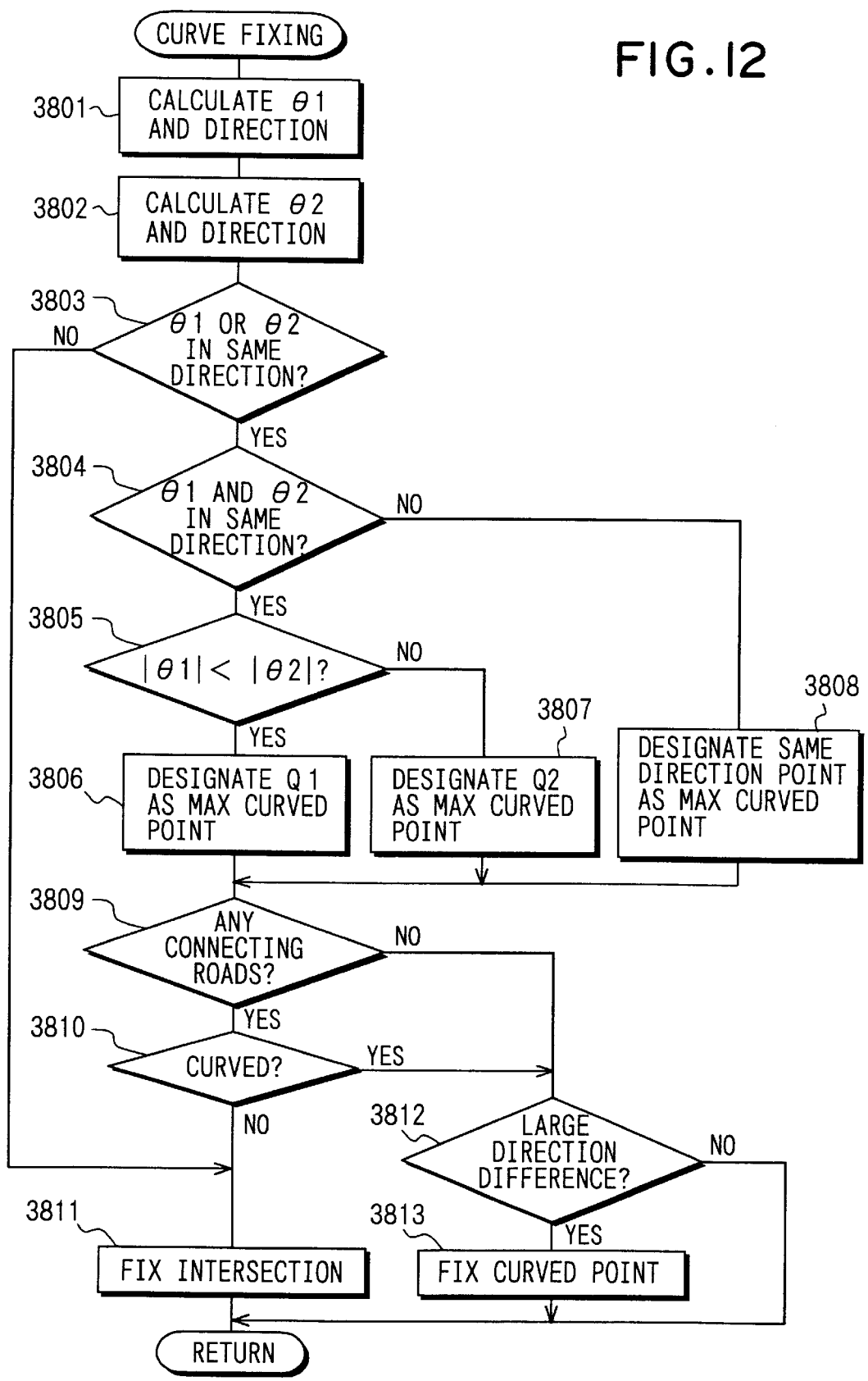
FIG. 12 is a flow diagram showing a curve fixing processing shown in FIG. 3.

The curve fixing processing of steps 38 (FIG. 3) and 393 (FIG. 4) are executed as shown in FIG. 12. In FIG. 12, the four road coordinate points are represented by Q0–Q3. It is preferred in the curve fixing processing that the road coordinate points, which correspond to intersections, should be informed as not curves but intersections. It is necessary to detect the intersections that connections of roads are referred to with respect to the curve point which has the minimum radius of curvature. However, the road coordinate points are not arranged uniformly. It occurs that the curve points, which provide the minimum radii of curvature, do not correspond to the road coordinate points, even if the above coordinate correlation processing is executed. Therefore, the curve fixing processing shown in FIG. 12 is necessitated.

Figure 13:
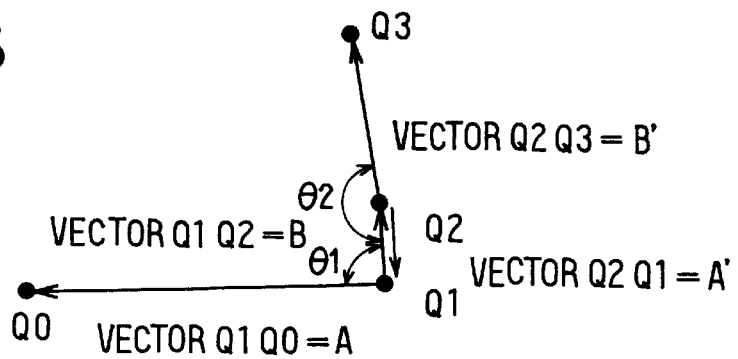
FIG. 13 is a schematic diagram showing a principle of calculating an inner product of vectors.

Specifically, the computer 1 calculates at step 3801 the angle $\theta 1$ (FIG. 13) between a vector Q1Q0 and a vector Q1Q2 as cos $\theta 1$ ($=A \times B / |A| \times |B|$) from the inner product of the vectors. It further calculates the direction from the outer product of the vectors. The computer 1 similarly calculates at step 3802 an angle $\theta 2$ (FIG. 13) between a vector Q2Q1 and a vector Q2Q3 as well as a direction of angle $\theta 2$ as cos $\theta 2$ ($=A' \times B'/|A'| \times |B'|$). The computer 1 then checks at step 3803 whether the direction of angle $\theta 1$ or $\theta 2$ is in the same direction as the turning direction of the curve.

If the check result at step 3803 is YES indicating that at least one of the angles $\theta 1$ and $\theta 2$ is in the same direction, the computer 1 further checks at step 3804 whether both of the angles $\theta 1$ and $\theta 2$ are in the same direction. If the check result at step 3804 is YES, the absolute values of the angles $\theta 1$ and $\theta 2$ are compared at step 3805.

If the check result at step 3805 is YES ($|\theta 1|<|\theta 2|$), the road coordinate point Q1 is designated as a candidate of maximum curve point (intersection) at step 3806. However, if the check result is NO ($|\theta 1| \geq |\theta 2|$), the road coordinate point Q2 is designated as another candidate of maximum curve point at step 3807. Still further, if the check result at step 3804 is NO indicating that only one of the angles θ1 or θ2 is in the same direction as the curve turning direction, the road coordinate point the direction of which is the same is designated as a further candidate of maximum curve point at step 3808.

After designating the candidates as above, the computer 1 checks at step 3809 whether the road coordinate point of the above candidates is connected to any roads (coordinate points) which extend in the direction different from the expected travel direction of the vehicle. If the check result is YES, the computer 1 checks at step 3810 whether the candidate can be considered to be the curve or intersection. In this checking, information regarding attributes of such roads stored in the memory device 7 may be referred to.

Figure 14:
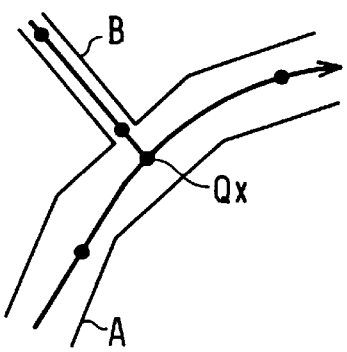
FIG. 14 is a schematic diagram showing an example of a road configuration in which roads directed differently are connected to a travel path.

It may occur, as shown in FIG. 14, that a narrow road B is connected in a different direction to a travel path A of the vehicle at a road coordinate point Qx where the curving is small. In this instance, however, it is more appropriate for the vehicle driver to consider the road coordinate point Qx as a curve and not an intersection, even if the road coordinate point Qx is generally understood as an intersection.

It is preferred to execute the curve detection in correspondence with driver's normal sense. That is, it is preferred not to determine such a limited-type road as an intersection but to determine as a curve. The limited-type road may include roads which are so different from the travel path A in respect of the width, elevation, category (expressway, national road, prefectural road, narrow road, etc.), the stored data of which are insufficient, or which are hidden behind buildings.

If the check result at step 3810 is NO indicating that it is not a curve, the computer 1 fixes the candidate determined at step 3806, 3807 or 3808 to be the intersection. If the check result at step 3810 is YES, on the other hand, the computer 1 checks at step 3812 whether the accumulated direction difference calculated at step 395 is more than a predetermined value.

If the check result at step 3812 is YES, the computer 1 fixes at step 3813 the interpolated coordinate point P(t) which was renewed at step 390 as the minimum radius of curvature r at step 390 to the curve point. The computer 1 finishes the above curve fixing processing, if the check result at step 3812 is NO or the curve is fixed as above at step 3813.

Figure 15:
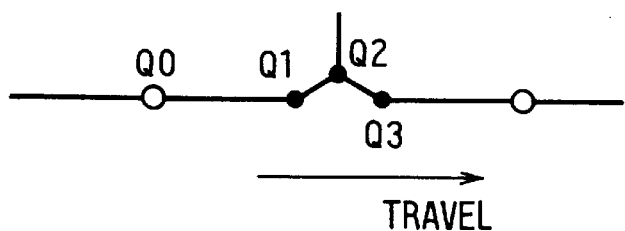
FIG. 15 is a schematic diagram showing an arrangement of road coordinate points which are defined in high density near a T-shaped intersection.

The curve point is thus determined with reference to the accumulated direction difference for the following reason. In the case of the T-branched road such as that shown in FIG. 15, for instance, the road coordinate points are arranged comparatively finely near the road coordinate points to which roads are connected in different directions. In this instance, the accuracy in the road coordinate points is relatively lowered. The radius of curvature r is calculated small and may fall within the curve fixing range R0, if the interpolation is executed including Q1–Q3 in spite of presence of a straight part. If the curve interval is determined based solely on the curvature, the path Q0–Q3 is likely to be determined as a curve despite that it is substantially a straight road. It is therefore preferred to set the large accumulated direction difference as a precondition for fixing the curve point.

Figure 16:
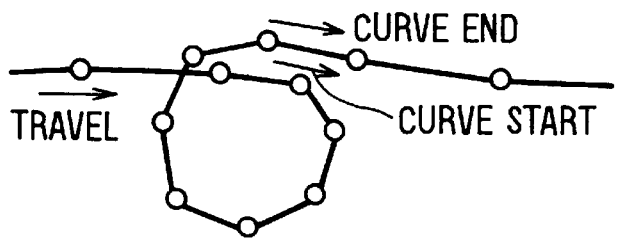
FIG. 16 is a schematic diagram showing an arrangement of road coordinate points for a rotary-type curve.

In addition, the curve point fixing is executed not based on the direction difference of the curve interval but based on the accumulated value of the direction differences for the following reason. In the case of a rotary-type road shown in FIG. 16, for instance, the direction difference of the curve interval from a curve start point and a curve end point is substantially zero and hence information of the curve cannot be provided.

According to the first embodiment described above, the computer 1 calculates the radius of curvature r using the spline function which defines a curve passing through four successive coordinate points Q0–Q3 representing a road configuration. The computer 1 further determines the curve based on the calculated radius of curvature r and the direction of the curve, and informs the driver of the determined curve on the display device 5 and from the speaker 6.

As a result, it is enabled to draw a smooth spline curve line using the spline function, even if the accuracy of the coordinate points representing the road configuration included in the map data is not sufficiently high. It is also enabled to determine the curve accurately, because the radius of curvature r corresponding to the smoothed curve can be calculated for each interpolated coordinate point. The accuracy of interpolation can be varied with ease by varying the interpolation step t.

Further, the radius of curvature r is calculated as expression 5. As a result, the radius of curvature r can be calculated in less calculation load, and the direction of curve can be determined based on the polarity of the calculated radius of curvature r. Thus, the calculation load can be reduced and calculation speed can be increased.

The computer 1 determines as a single large curve the road which includes a short straight part between the two curve intervals. It further determines that the direction is not changed by the curve, when the calculated radius of curvature r is large. As a result, it is less likely that the road, which is substantially straight, is erroneously determined as curving due to a slight change in direction of the road.

The computer 1 calculates the inclination of the tangent of the interpolated point, and determines the curve interval based on the accumulated change of the inclinations. Thus, in the interval where the road coordinate points are arranged comparatively densely, it is less likely that the curve interval is determined erroneously in the case that the accuracy of the coordinate points is relatively low. Further, it is enabled to determine and inform the curve even in the case of unusual road configurations such as the rotary-type road.

The computer 1 calculates the radius of curvature r by dividing four coordinate points Q0–Q3 into ten equal intervals. It further divides the coordinate points Q1–Q2 into ten equal intervals to calculate the interpolated coordinate point P'(t). The radii of curvature r0–r10 calculated with respect to the interpolated coordinate points P(t) are assigned to the interpolated coordinate points P'(t) between the coordinate points Q1 and Q2, so that the interpolated coordinate points are correlated to the road coordinate points. As a result, even if the curve is turning at an acute angle, it is less likely that the maximum curve point excessively deviates from the original road coordinate point. Thus, it is enabled to indicate the curve point along the road defined by the road coordinate points.

In addition, the computer 1 determines the coordinate points Q1 and Q2 as the candidates of maximum curve points based on the vector calculations on the vectors Q1Q0 and Q1Q2 and on the vectors Q2Q1 and Q2Q3. The computer 1 further determines the curve or intersection based on the road connecting conditions with respect to each candidate of the maximum curve point. As a result, even if the coordinate points of the minimum radius of curvature (after coordinate correlation) exist between two road coordinate points, the intersection can be determined accurately.

Still further, the computer 1 eliminates the candidate of the maximum curve point from checking for the intersection, if the attributes of the different road connected to the travel path connected to the candidate of the maximum curve point differs from the predetermined condition. Thus, the curve can be determined in a manner to match with drivers' normal sense.

Second Embodiment

Figure 17:
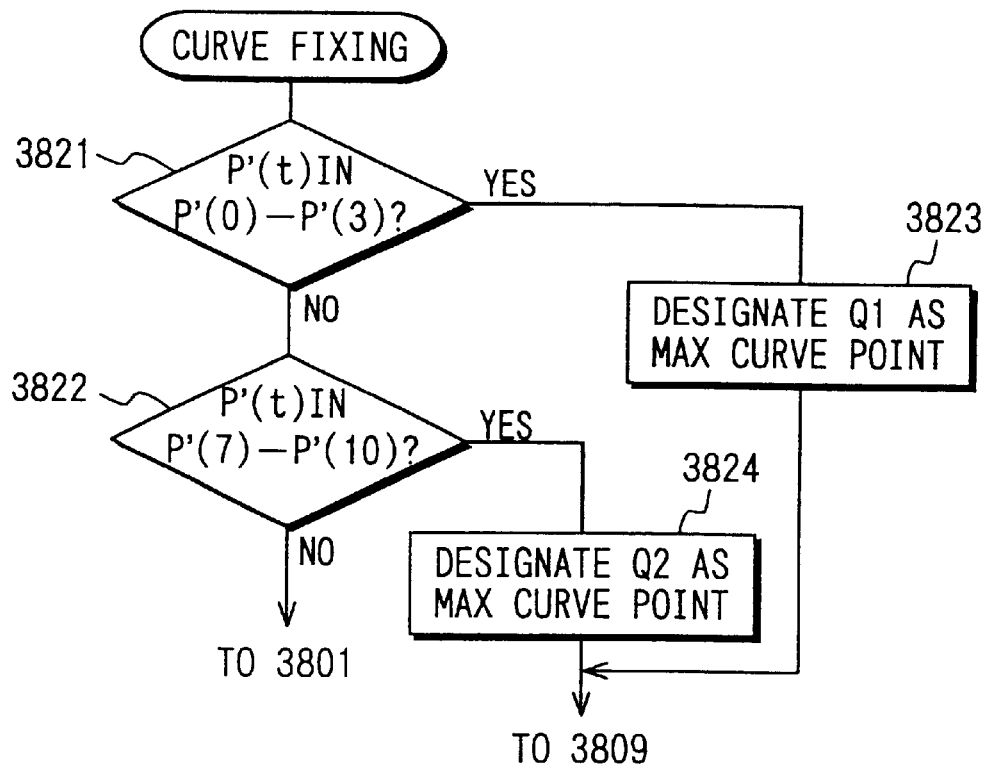
FIG. 17 is a flow diagram showing a part of curve fixing processing executed in a second embodiment of the present invention.

In the second embodiment, the curve fixing processing of the first embodiment is partly modified. That is, the computer 1 is programmed to execute processing shown in FIG. 17 before the curve fixing processing shown in FIG. 12. Specifically, the computer 1 executes the following processing by using the interpolated coordinate points P'(0)–P'(10) between Q1 and Q2 determined in the coordinate correlation processing at step 36 (FIG. 3).

Figure 7:
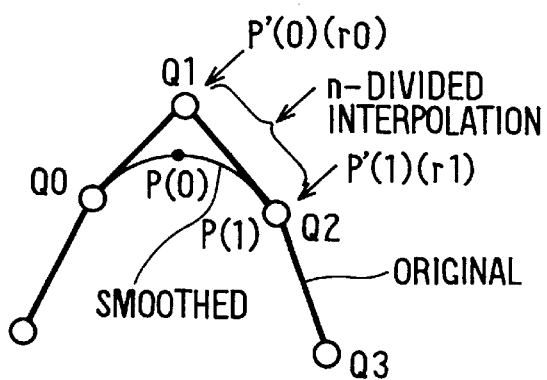
FIG. 7 is a schematic diagram showing a principle of correlating coordinate points.

As shown in FIG. 7, the computer 1 checks at step 3821 whether the interpolated coordinate point P'(t) at which the radius of curvature r is minimum is within P'(0)–P'(3). If the check result is NO, the computer 1 further checks at step 3822 whether it is within P'(7)–P'(10). If the check result at step 3821 is YES, the computer 1 designates Q1 as a candidate of intersection (maximum curve point) at step 3823. If the check result at step 3822 is YES, the computer 1 designates Q2 as a candidate of intersection (maximum curve point) at step 3824. The computer 1 then executes steps 3809–3813 (FIG. 12). If the check result at step 3822 is NO indicating that the interpolated coordinate point P'(t) is within P'(4)–P'(6), the computer 1 executes steps 3801–3813 (FIG. 12).

The interpolated coordinate point P'(t) of the minimum radius of curvature is located near the road coordinate point Q1 and the road coordinate point Q2 when it is within P'(0)–P'(3) and within P'(7)–P'(10),respectively. In this instance, the candidates of the maximum curve point can be determined with ease without calculating and comparing. That is, it is necessitated to calculate and compare the angles θ1 and θ2 between the vectors for determining the candidate of the maximum curve point, when the interpolated coordinate point P'(t) is within P'(4)–P'(6). The computer 1 is not required to execute steps 3803 and 3804 and is required to execute 3805.

Figure 18:
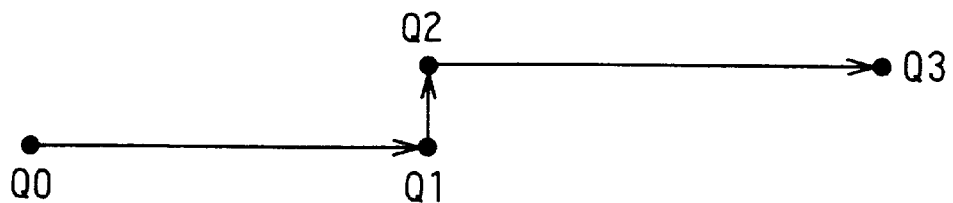
FIG. 18 is a schematic diagram showing an arrangement of road coordinate points for an S-shaped curve.

Further, in the case of a short S-shaped curve between Q1 and Q2 as shown in FIG. 18, it is not likely that the maximum curve point exists near the center between Q1 and Q2. Therefore, directions of curves need not be compared.

According to the second embodiment described above, the computer 1 determines the candidates of intersections from the interpolated coordinate points of the minimum radius of curvature between the road coordinate points Q1 and Q2. Thus, the number of vector calculations for determining intersections can be reduced and the speed of determination processing can be increased.

The present invention should not be limited to the above-described embodiments, but may be modified in many other ways without departing from the spirit of the invention.

For instance, the interpolation may be executed based on five or more road coordinate points. The curve function may be other spline functions such as Bezier curve function. The direction fixing range R1, curve fixing range R0 and curve fixing distance L may be set arbitrarily. The direction of angle between vectors may not be calculated from the outer product of vectors.

If a curve of large radius of curvature as in expressways, the number of coordinate points in the curve interval increases and the accuracy of coordinate points lowers relatively. Therefore, the curve fixing distance L may be set variably based on types of the present travel path to improve the accuracy of coordinate points. For instance, the distance L may be set short in the case of normal roads and long in the case of expressways.

Further, the road coordinate points for defining a curve line need not be successive ones but may be discrete ones. The intersection determination may be applied to a case where a curve is detected from a circumscribed circle. Curves and intersections need not be separated, but may be categorized as smooth curves or sharp curves.

What is claimed is:

1. A vehicular navigation system comprising:
   retrieval means for retrieving at least four coordinate points included in map data stored in memory means, the coordinate points representing a road configuration;
   radius calculation means for defining a curve line based on the retrieved coordinate points, for calculating interpolated coordinate points based on the retrieved coordinate points and for calculating a radius of of the curve line with respect to each of the interpolated coordinate points;
   curve detection means for detecting a road curve based on the calculated radius of curvature of the curve line with respect to the each of the interpolated coordinate points; and
   control means for driving information means to provide information about the road curve.

2. A vehicular navigation system as in claim 1, wherein the radius of curvature at the interpolated coordinate point P(t)=[x(t), y(t)] is calculated as $$r=[x(t)'^2+y(t)'^2]^{3/2}/[x(t)'x\ y(t)''-x(t)''x\ y(t)'].$$

3. A vehicular navigation system as in claim 1, wherein the curve detection means determines two curve intervals as one curve interval, if a distance between an end point of one curve interval in one direction and a start point of a next curve interval in the same direction is less than a predetermined distance.

4. A vehicular navigation system as in claim 3, wherein the curve detection means varies the predetermined distance based on types of roads which a vehicle takes.

5. A vehicular navigation system as in claim 1, wherein the curve detection means determines no direction change in the curve, if the calculated radius of curvature is more than a predetermined radius.

6. A vehicular navigation system as in claim 1, wherein the curve detection means calculates inclinations of tangents with respect to the interpolated coordinate points and accumulates differences of the calculated inclinations for detecting the curve by using the accumulated differences.

7. A vehiclular navigation system as in claim 1, further comprising:
   coordinate correlation means for allocating the calculated radius of curvature on a line segment passing through two coordinate points of the four coordinate points by weighting the interpolated coordinate points to position the interpolated coordinate points near the two coordinate points of the four coordinate points.

8. A vehiclular navigation system as in claim 1, wherein the radius calculation means calculates the radius of curvature with respect to each coordinate points by using a spline function based on the retrieved four coordinate points.

9. The vehicular navigation system of claim 1, further comprising coordinate correlation means for enabling the road curve to be indicated even when a maximum curve point deviates significantly from a road coordinate point.

10. The vehicular navigation system of claim 1, further comprising intersection candidate means for determining intersection candidates between two of the road coordinate points from those of the interpolated coordinate points having an associated minimum radius of curvature.

11. The vehicular navigation system of claim 1, further comprising curve fixing means for corresponding calculated curve points on the road curve to the coordinate points.

12. The vehicular navigation system of claim 11, wherein the curve fixing means is further for designating maximum curve points based on coordinate point vectors and coordinate point vector angles to enable the radius calculation means to define the curve line based on the retrieved coordinate points.

13. The vehicular navigation system of claim 1, wherein each of the interpolated coordinate points is calculated using a spline function.

14. The vehicular navigation system of claim 1, wherein the radius calculation means calculates the radius of curvature of the curve line with respect to each of the interpolated coordinate points based on tangent angles at outer limit interpolation points and a distance between the outer limit interpolation points.

15. A vehicular navigation system comprising:
retrieval means for retrieving at least four coordinate points included in map data stored in memory means, the coordinate points representing a road configuration;
curve detection means for detecting a road curve based on the retrieved coordinate points;
maximum point detection means for detecting a maximum curve point in an interval of the detected road curve; and
curve determination means for determining the curve based on attributes of roads which are connected to the maximum curve point and which do not extend along a travel path of a vehicle.

16. A vehicular navigation system as in claim 15 further comprising:

vector calculation means for executing vector calculations between vectors Q1Q0 and Q1Q2 and between vectors Q2Q1 and Q2Q3 with Q1, Q2, Q3 and Q4 being the coordinate points,
wherein the maximum point detection means determines the maximum curve point from one of the coordinate points Q1 and Q2 based on a result of the vector calculations.

17. A vehicular navigation system as in claim 15 further comprising:
radius calculation means for defining a curve line based on the retrieved coordinate points, for calculating interpolated coordinate points based on the retrieved coordinate points and for calculating respective radii of curvature for the curve line for the interpolated coordinate points;
wherein the maximum point detection means detects the maximum curve point based on a position of an interpolated coordinate point which has a minimum one of the calculated radii of curvature.

18. A vehicular navigation system comprising:
a computer for retrieving at least four coordinate points included in stored map data, the coordinate points representing a road configuration;
the computer for defining a road curve based on the retrieved coordinate points, for calculating interpolated coordinate points based on the retrieved coordinate points and for calculating respective radii of curvature associated with the interpolated coordinate points;
the computer further for detecting a road curve based on the calculated radii of curvature and for outputting information about the road curve.

19. The vehicular navigation system of claim 18, wherein the interpolated coordinate points are calculated using a spline function.

* * * * *